(12) United States Patent
Röser

(10) Patent No.: US 6,362,448 B1
(45) Date of Patent: Mar. 26, 2002

(54) FASTENING ELEMENT, SUCH AS A SHORT-SHANKED T-STUD OR SELF-PIERCING RIVET, AND FEEDER FOR THE FASTENING ELEMENT

(75) Inventor: Hermann Röser, Kommern (DE)

(73) Assignee: Emhart Inc., Newark, DE (US)

( * ) Notice: Subject to any disclaimer, the term of this patent is extended or adjusted under 35 U.S.C. 154(b) by 0 days.

(21) Appl. No.: 09/672,795

(22) Filed: Nov. 18, 1999

Related U.S. Application Data

(63) Continuation-in-part of application No. 09/061,133, filed on Apr. 16, 1998.

(30) Foreign Application Priority Data

Apr. 17, 1997 (DE) ...................................... 297 06 963 U

(51) Int. Cl.$^7$ ................................................ B23K 9/20
(52) U.S. Cl. ............................. 219/99; 219/98; 227/50
(58) Field of Search ........................ 219/98, 99; 227/50

(56) References Cited

U.S. PATENT DOCUMENTS

| | | | | |
|---|---|---|---|---|
| 2,991,858 A | * | 7/1961 | Taylor et al. | |
| 3,758,743 A | * | 9/1973 | Lake | 219/98 |
| 3,792,223 A | * | 2/1974 | Spisak | 219/98 |
| 3,854,027 A | * | 12/1974 | Ettinger et al. | 219/98 |
| 4,202,243 A | * | 5/1980 | Leonhardt | |
| 4,528,739 A | * | 7/1985 | Kemp | |
| 4,854,438 A | * | 8/1989 | Weissenberger et al. | |
| 5,305,940 A | * | 4/1994 | Gerhardt et al. | 219/98 |
| 5,384,445 A | * | 1/1995 | Nakagami | 219/98 |

FOREIGN PATENT DOCUMENTS

| | | | |
|---|---|---|---|
| GB | 2175970 | * | 12/1986 |
| GB | 2299843 | * | 10/1996 |

* cited by examiner

Primary Examiner—Clifford C. Shaw
(74) Attorney, Agent, or Firm—Edward D. Murphy

(57) ABSTRACT

A fastening element for fastening on or in a component, in particular a T-stud or punch rivet, has a fastening end. The fastening element has, at a guide end remote from the fastening end, a recess for receiving a tool end piece which fits into the recess and by means of which the fastening element can be positioned.

16 Claims, 3 Drawing Sheets

FASTENING ELEMENT, SUCH AS A SHORT-SHANKED T-STUD OR SELF-PIERCING RIVET, AND FEEDER FOR THE FASTENING ELEMENT

This application is a continuation-in-part of co-pending U.S. patent application, Ser. No. 09/061,133, filed on Apr. 16, 1998, entitled "Fastening Element, in Particular Short-Shanked T-Stud or Punch Rivet, and Feeder for the Fastening Element".

BACKGROUND OF THE INVENTION

The invention relates to a fastening element which can be connected to a component. In particular, the invention relates to a T-stud or a punch (or self-piercing) rivet with a short shank. The invention also relates to a device for feeding a fastening element to a fastening position in which it can be fastened on or in a component. The feeder has a loading duct and a loading pin capable of reciprocating in the loading duct. The fastening element is pushed into the fastening position by a movement of the loading pin.

A fastening element designed as a weld stud is known, for example, from U.S. Pat. No. 4,799,842, wherein the weld stud has a cylindrical region to be grasped by a stud-welding device which is adjoined by a threaded shank of smaller diameter. The cylindrical region to be grasped by the stud-welding device is relatively narrow, so that there is a risk, as the stud is being fed to a fastening position in which the stud is welded, that the weld stud will not be fed in the correct orientation, for example will not be fed with its fastening end first.

A feeder for in particular elongate fastening elements designed, with a head, is described in U.S. Pat. No. 5,588,576. The feeder has clamping tongs with at least two clamping arms, the clamping arms having a guide step for guiding the elongate fastening element and a recess adapted to the external shape of the elongate components to be clamped. Jamming or tilting of the fastening elements to be fed is avoided in this way, in particular at high feed rates.

U.S. Pat. No. 5,695,045 describes a stud feeder comprising a loading duct with a stud feed orifice designed substantially perpendicularly to the loading duct and a loading pin capable of reciprocating in the loading duct. A stud to be fed is shifted from the stud feed orifice to a stud holder by the loading pin. The loading duct is designed in the form of tubular tongs which are slotted at least over a proportion of their length and of which the tong segments separated from one another by the slots are resiliently substantially perpendicularly to the length. Secure, reliable positioning of the stud in the stud holder is therefore achieved, in particular also in the case of T-studs with a short shank the shank length of which is smaller than the head diameter.

U.S. patent application Ser. No. 08/941,923 now U.S. Pat. No. 6,015,962, also discloses a stud welding device with stud feeder, of the welding gun type. The loading duct of the stud feeder has, at an outlet aperture, a stud holder with resilient holding fingers. A stud can be held and guided in the correct position by the stud holder both during the feed process and during the subsequent welding process.

SUMMARY OF THE INVENTION

It is an object of the present invention to provide a fastening element and a device for supplying the fastening element to a fastening position which ensures reliable positionally correct feeding of the fastening element into the fastening position.

The present invention provides a fastening element for fastening on or in a component, in particular T-stud or punch rivet, with a fastening end, characterised in that the fastening element has, at a guide end remote from the fastening end, a recess for receiving a tool end piece which fits into the recess and by means of which the fastening element can be positioned.

The present invention further provides a device for supplying a fastening element into a fastening position in which the fastening element can be fastened on or in a component, with a loading duct and a loading pin capable of reciprocating in the loading duct, characterised in that the loading pin has a tool end piece fitting into the recess such that the fastening element can be guided positionally correctly into the fastening position.

The fastening element according to the invention has, at a guide end remote from the fastening end, a recess for receiving a tool end piece fitting into the recess. If the fastening element is guided into the fastening position by means of a suitable tool, there is at most a limited possibility that the fastening element will adopt a position different from the proposed position. The tool can therefore be guided rigidly or can be guided flexibly to a certain extent so it can follow possible movements of the fastening element from the proposed position to a desired limit. In either case, the fastening element will maintain engagement with the tool end piece in the region of the recess and will not be able to deviate further than from the maximum deviation in position.

In a development of the fastening element according to the invention, the fastening element is a so-called T-stud or a punch rivet with a shank and a head connected to the shank, the head having a greater cross-sectional area than the shank and the head forming the guide end with the recess.

In a further development, the length of the fastening element, measured between the fastening end and the guide end, is smaller than or equal to the width of the fastening element, measured perpendicularly to the longitudinal direction, i.e. to the direction in which the length is measured. Fastening elements of such a design deviate from the correct position particularly easily during the feed process if they are fed longitudinally in a feed duct. This can reliably be avoided with the design, according to the invention, of a recess at the guide end.

For many applications it is desirable if the external contour is substantially symmetrical with respect to a longitudinal axis of the fastening element, the recess also being substantially symmetrical with respect to the longitudinal axis.

In an advantageous design of the fastening element, the recess tapers from the guide end toward the fastening end, i.e. the cross-sectional area of the recess diminishes. An advantage of this design is that the tool end piece can be reliably introduced into the recess even if the fastening element is not in exactly the correct position. A further advantage is that a fastening element is correctly orientated if it is guided laterally along a guide by means of the tool end piece.

The cross-sectional area of the recess can be, for example, polygonal or circular. With a circular design, a tool end piece which is also circular in cross section is preferably used. The tool end piece can be introduced into the recess without axial rotation. In certain circumstances, the fastening element is to be fed in a specific rotational position with respect to a longitudinal axis. A recess having a polygonal cross-sectional area is advantageous in such cases.

The feeder according to the invention has a loading duct, in which a fastening element according to the invention can be guided into a fastening position, and a loading pin capable of reciprocating in the loading duct. The loading pin has a tool end piece fitting into the recess so that the fastening element can be guided positionally correctly into the fastening position. The fastening element is preferably introduced into the loading duct by an elastic tube the internal cross section of which corresponds substantially to the longitudinal section of the fastening element. The loading pin travels from a retracted position with the tool end piece first onto the guide end of the positionally substantially correctly orientated fastening element and engages in the recess with the tool end piece. The fastening element is guided in the loading duct to the fastening position by continued movement of the loading pin.

Like known feeders, the feeder according to the invention can be designed with a loading duct and a loading pin but with the difference that the loading pin has the tool end piece. Reference is made to the content of U.S. patent application Ser. No. 08/941,923 and U.S. Pat. No. 5,695,045 for details of such feeders.

In a development of the feeder, the tool end piece fits positively into the recess at the guide end of the fastening element. An advantage of this design is that the fastening element can be supplied with play which is not or is only insignificantly greater than the play with which the loading pin is moved in the loading duct.

In a further design, the loading pin has a base portion the cross-sectional area of which is greater than the cross-sectional area of the tool end piece so that the base portion can be brought to rest on the guide end of the fastening element outside the recess. An advantage of this design is that, in particular, T-studs or punch rivets with a short shank can be fed particularly reliably into the correct position.

BRIEF DESCRIPTION OF THE DRAWINGS

An embodiment of a fastening element will now be described with reference to the accompanying drawings, in which.

DESCRIPTION OF THE PREFERRED EMBODIMENT

Various systems for delivering and attaching fastening elements to components such as automobile frame parts or body parts by welding or riveting are well known and widely used. For example, U.S. Pat. No. 5,305,940, the disclosure of which is incorporated herein by reference, describes a system for delivering and attaching T-studs by welding. Similarly, European Patent Application No. EP 0 567 240, the disclosure of which is also incorporated herein by reference, describes a system for delivering and attaching punch (or self-piercing) rivets.

Figure 1:
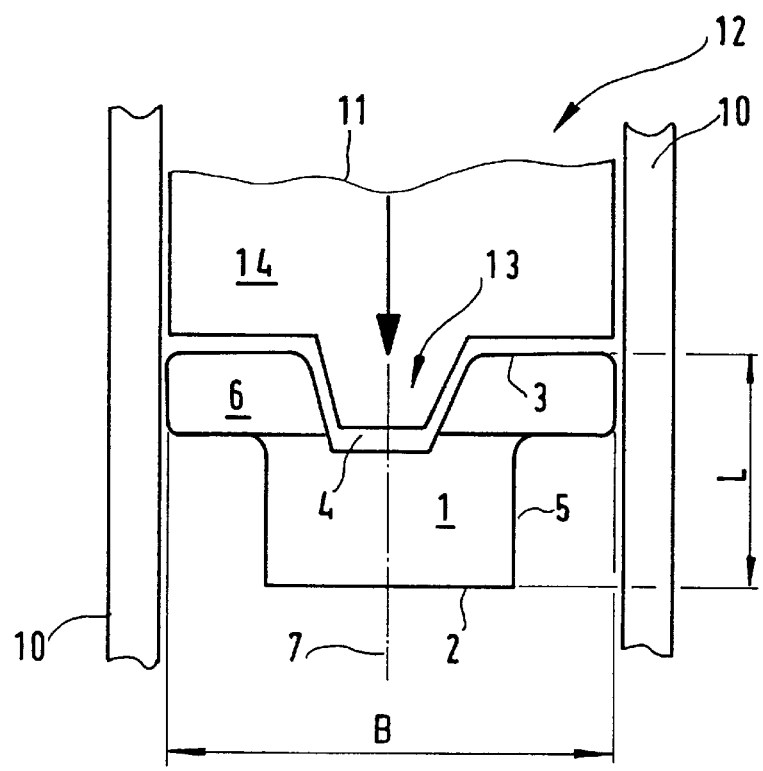
FIG. 1 is a longitudinal section through a T-stud being fed in a longitudinal duct.

FIG. 1 is a longitudinal section through a loading duct at a particular moment in a feed process. A fastening element in the form of a T-stud 1 is fed with its fastening end first in the direction of the arrow. A recess 4 is formed at the guide end 3 of the T-stud 1. The length L of the T-stud 1 is smaller than the width B, measured perpendicularly to the longitudinal axis 7 of the T-stud 1. As the external contour of the T-stud 1 is rotationally symmetrical to the longitudinal axis 7, the width B is equal to the external diameter of the stud head 6. The shank 5 is relatively short for the same reason.

Of the stud feeder, only the duct wall 10 of the loading duct 12 and the loading pin 11 are shown in FIG. 1. The loading pin 11 has, at its end facing the T-stud, the tool end piece 13 which is designed as a centrally longitudinally arranged projection of the base portion 14. The base portion 14 extends almost over the entire width of the loading duct 12. The end face, turned towards T-stud, of the base portion 14 is formed with the tool end piece 13 such that it can be brought into positive contact with the guide end 3 of the T-stud. Positionally correct feeding is therefore guaranteed despite undesirable relationships between the length L and the width B of the T-stud 1.

Figure 2:
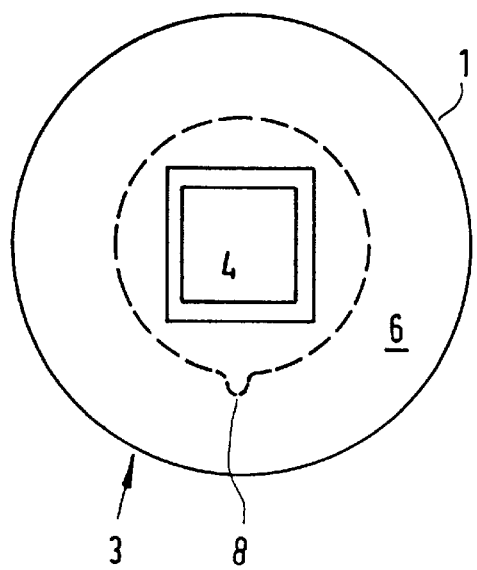
FIG. 2 is a plan view of the stud head shown in FIG. 1.

FIG. 2 shows that the recess 4 which is to taper from the guide end 3 toward the fastening end 2 has a square cross-sectional area. The T-stud 1 can therefore be fed in a non-rotatable manner. This is necessary because the shank 5 of T stud 1 has a nose 8 which is to be held in a specific rotational position with respect to the longitudinal axis 7.

Figure 3:
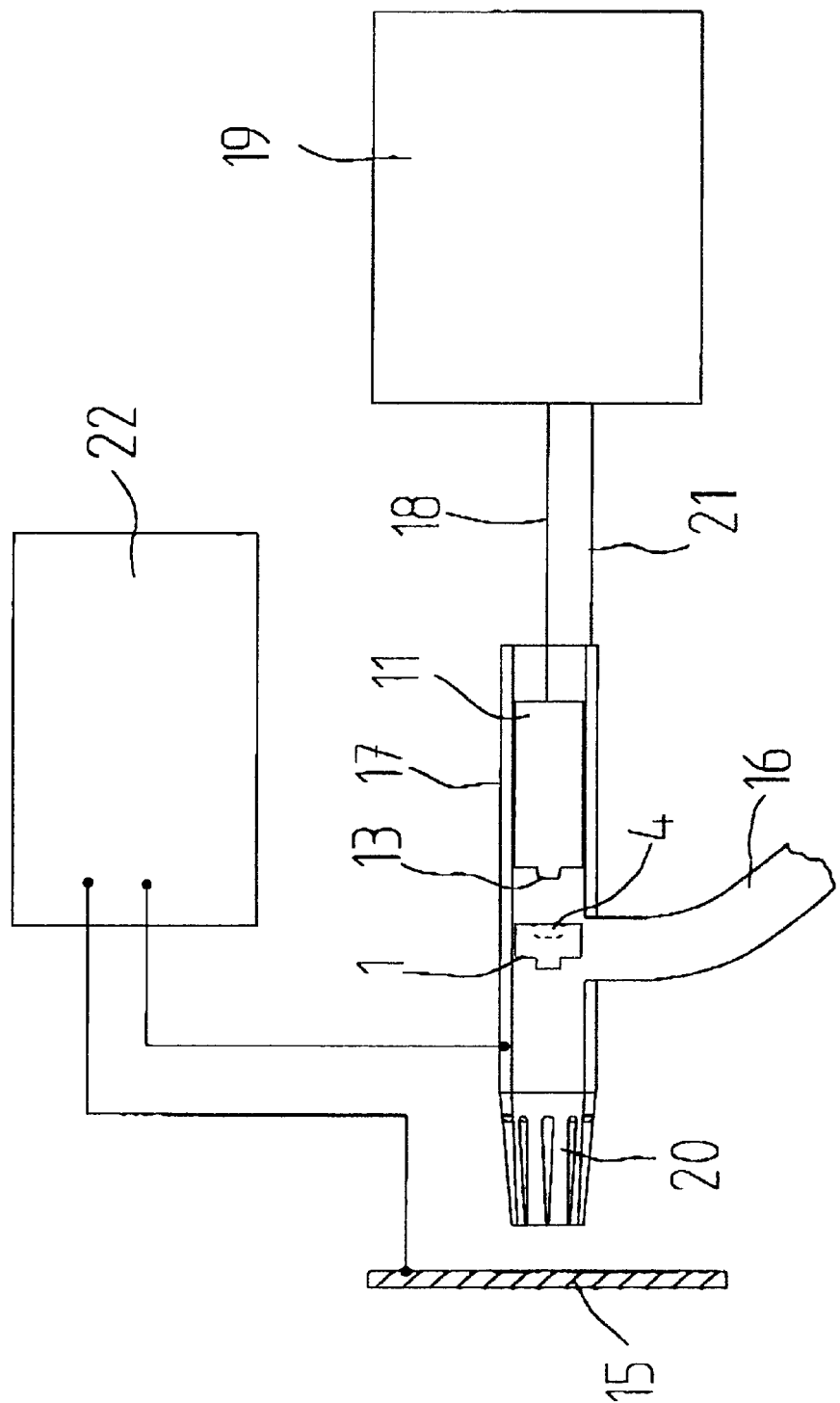
FIG. 3 shows a system for installing weld studs in accord with the present invention.

FIG. 3 shows a system for installing the T-stud 1 on a component 15 which may be, for example, a portion of a car body. The system includes a flexible tube 16 through which T-studs are successively delivered to a feed tube 17. The loading pin 11 is driven within the feed tube 17 by means of a coupling 18 to a linear motor 19 or another conventional source of power. When the T-stud 1 is driven to the collet 20 at the end of the feed tube, the linear motion source 19, through coupling 21, operates the feed tube 17 so that the welding circuit 22 draws a welding arc between the T-stud 1 and the component 15 whereupon the T-stud is plunged into a molten pool of metal on the surface of component 15, in the known manner. The loading pin 11 includes an end piece 13 which engages the recess 4 in T-stud 1 as previously described.

Figure 4:
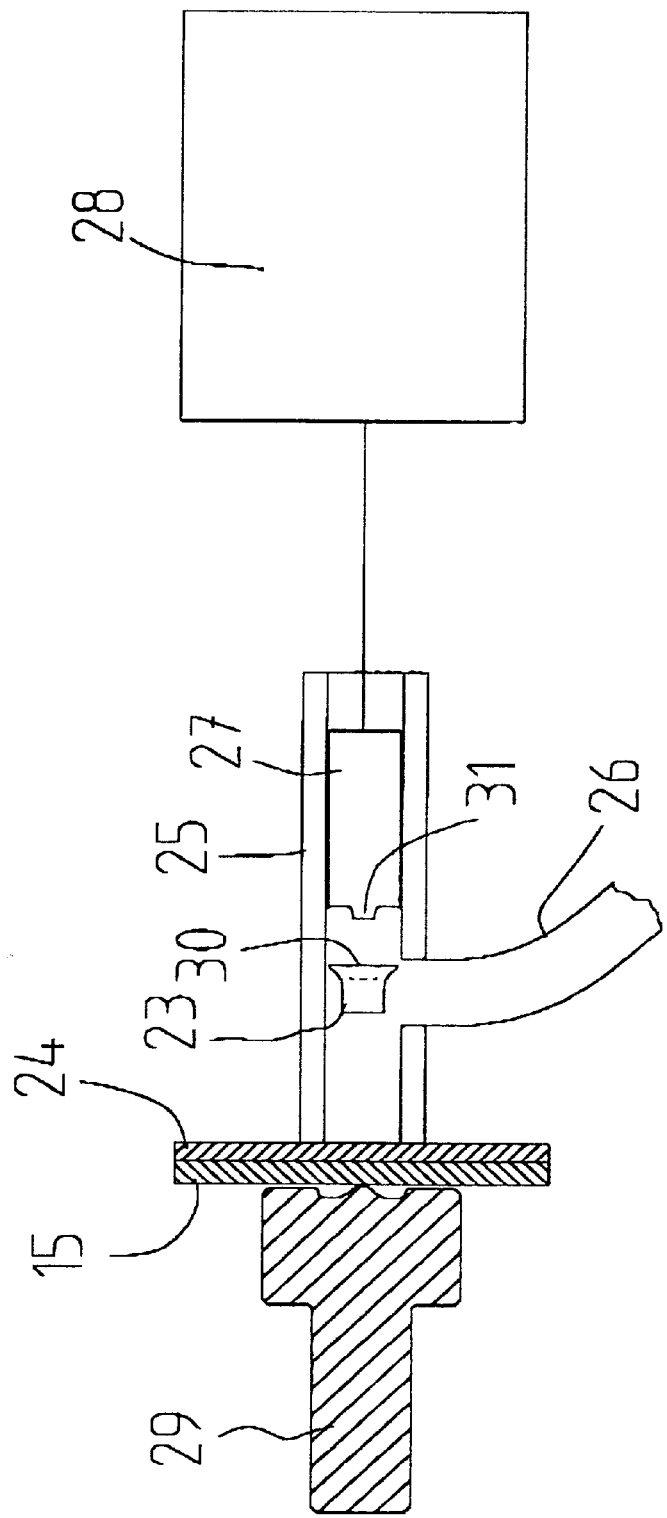
FIG. 4 shows a system for installing self-piercing rivets in accord with the present invention.

FIG. 4 illustrates the application of the present invention to a self-piercing rivet 23 which is delivered to and installed on a component 15, commonly for the purpose of attaching a second layer 24 thereto. The rivet 23 is delivered to a feed tube 25 from a delivery device such as a flexible tube 26. Within the feed tube 25, a loading pin 27 is coupled to a high-speed pressure source 28 to drive the rivet 23 through the component 24 and into the component 15. Within the component 15, the base of the rivet 23 and the encapsulating sheet metal of the component 15 are formed outwardly by the die 29 to form the desired joint between the two components.

As in the case of the T-stud 1, the rivet 23 includes a recess 30 and the loading pin 27 includes a corresponding end piece 31 which function as previously described to maintain the alignment of the rivet as it is being installed.

The fastening element according to the invention and the feeder according to the invention ensure that the fastening element can be guided positionally correctly into a fastening position. Known fastening elements and feeders can be produced inexpensively as they can be derived from the state of the art by constructionally simple measures. It is therefore possible, with minimal expenditure, to prevent fastening devices from jamming when being fed in a loading duct and thus possibly damaging or destroying expensive feeders. In particular during mass production processes, the reliable positionally correct feeding of fastening elements extends the actual machine running, times of the entire mass production plant as a failure of a single machine interrupts the entire production process.

Variations and modifications of the concept expressed in the foregoing specification will readily occur to those skilled in the art. It is intended that the appended claims should cover all such variations and modifications.

What is claimed is:

1. A method of delivering a fastening element to a fastening position at which the element is attached to a component comprising the steps of providing a fastener having an attachment end and a driven end, said driven end including a recess of predetermined configuration;

providing a loading duct through which the fastening element is moved to the fastening position;

providing a driving tool having an end shaped to fit into the recess in said fastening element;

operating the driving tool to engage the recess in a fastening element and to move the element through the loading duct to the fastening position, alignment of the fastening element with the loading duct being maintained by the engagement of the tool end in the recess; and fastening the element to a component.

2. A method as claimed in claim 1, wherein the length of the fastening element from the attachment end to the driven end is smaller than its largest dimension in a direction perpendicular to the length.

3. A method as claimed in claim 1 wherein the recess decreases in size as it extends into the fastening element.

4. A method as claimed in claim 1 wherein the recess is polygonal in cross-section.

5. A method as claimed in claim 1 wherein the fastening element is a self-piercing rivet and wherein said fastening step comprises the step of driving the rivet into a component.

6. A method as claimed in claim 1 wherein the fastening element comprises a weldable stud and wherein said fastening step comprises the step of welding the stud to the component.

7. In combination a feed tube adapted to deliver fastening elements to a component for attachment thereto;

a fastening element located in said feed tube, said fastening element having an attachment end and a driven end, said driven end including a recess extending into said element and having a predetermined shape;

a driving tool movable in said feed tube for moving said element through said tube to the component for attachment thereto, said driving tool comprising an end piece having a shape corresponding to said shape of said recess and adapted to extend into said recess for maintaining alignment of said element within said tube.

8. The combination claimed in claim 7 wherein said fastening element is substantially rotationally symmetric and wherein the length of said element is smaller than its largest diameter.

9. The combination claimed in claim 7 and further comprising apparatus operatively coupled to one of said feed tube and said driving tool for attaching said element to the component.

10. The combination claimed in claim 9 wherein said apparatus comprises a linear drive for moving said tool and said fastener to said component and a source of welding current connected between said feed tube and the component for welding said element to the component.

11. The combination claimed in claim 9 wherein said fastening element comprises a self-piercing rivet and said apparatus comprises a source of high pressure applied to said rivet through said driving tool for driving said rivet into the component.

12. The combination claimed in claim 9 wherein said element comprises a weldable T-stud.

13. The combination claimed in claim 9 wherein said element comprises a self-piercing rivet.

14. The combination claimed in claim 7 wherein said element includes a surface portion surrounding said recess and said tool includes an end surface surrounding said end piece, said end surface on said tool being adapted to contact said surface portion on said element for driving said element through said tube.

15. The combination claimed in claim 7 wherein said driven end of said fastening element comprises a circular head and said attachment end comprises a circular shank, the diameter of said shank being smaller than that of said head.

16. The combination claimed in claim 15 wherein the length of said element from said driven end to said attachment end is less than said diameter of said head."

* * * * *